(12) United States Patent
Weinberger

(10) Patent No.: US 10,737,602 B2
(45) Date of Patent: Aug. 11, 2020

(54) DEPLOYABLE ARMREST

(71) Applicant: Ford Global Technologies, LLC, Dearborn, MI (US)

(72) Inventor: Leo Weinberger, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 21 days.

(21) Appl. No.: 16/182,916

(22) Filed: Nov. 7, 2018

(65) Prior Publication Data
US 2020/0139865 A1 May 7, 2020

(51) Int. Cl.
*B60N 2/75* (2018.01)
*A47C 7/54* (2006.01)
*F16H 19/00* (2006.01)
*F16H 19/04* (2006.01)
*A47C 1/03* (2006.01)

(52) U.S. Cl.
CPC ........... *B60N 2/757* (2018.02); *F16H 19/001* (2013.01); *F16H 19/04* (2013.01); *A47C 1/03* (2013.01); *A47C 7/543* (2013.01); *B60N 2/767* (2018.02); *B60N 2/77* (2018.02)

(58) Field of Classification Search
CPC ........ B60N 2/753; B60N 2/757; B60N 2/767; B60N 2/77; F16H 19/001; F16H 19/04; A47C 7/541; A47C 7/543; A47C 1/03; A47C 1/0303; A47C 1/0307; A47C 1/0308; B60R 2011/0014
USPC ...... 297/411.31, 411.3, 411.35, 411.36, 238, 297/411.33, 1.09, 153
See application file for complete search history.

(56) References Cited

U.S. PATENT DOCUMENTS

| | | | | |
|---|---|---|---|---|
| 3,880,379 A * | 4/1975 | Booth | ..................... | B60R 22/34 200/61.58 B |
| 4,165,901 A * | 8/1979 | Swenson | .................. | A47C 1/03 297/411.33 |
| 4,244,623 A * | 1/1981 | Hall | ......................... | A47C 1/03 297/411.36 |
| 4,311,338 A * | 1/1982 | Moorhouse | .............. | B60N 2/77 297/411.36 |
| 4,655,501 A * | 4/1987 | Ishigami | ................ | B60N 2/767 297/113 |
| 4,828,323 A * | 5/1989 | Brodersen | ................ | B60N 2/77 297/411.36 |
| 4,973,017 A * | 11/1990 | Takagi | ................... | B60N 3/004 248/292.13 |
| 5,127,286 A * | 7/1992 | Wittig | .................. | B60N 2/2251 297/362 |
| 5,205,608 A * | 4/1993 | Stig | ....................... | B60N 2/3084 108/44 |
| 5,383,707 A * | 1/1995 | Osenkowski | ........ | B60N 2/3084 297/238 |
| 5,433,503 A * | 7/1995 | De Filippo | ............ | B60N 2/757 297/115 |
| 5,433,509 A * | 7/1995 | Hotary | .................. | B60N 2/767 297/411.33 |

(Continued)

*Primary Examiner* — Kyle J. Walraed-Sullivan
(74) *Attorney, Agent, or Firm* — David Coppiellie; Price Heneveld LLP

(57) ABSTRACT

An armrest includes a gear assembly with a crown gear directly coupled to the armrest that imparts rotational motion to the armrest, a planetary gear engaged with the crown gear, and a pinion gear coupled to the crown gear that imparts vertical motion of the entire gear assembly, and the armrest, along a rack.

16 Claims, 13 Drawing Sheets

(56) References Cited

U.S. PATENT DOCUMENTS

| | | | | |
|---|---|---|---|---|
| 5,498,062 A * | 3/1996 | Holdampf | B60N 2/3084 | 297/14 |
| 5,520,349 A * | 5/1996 | Kapanka | B60R 22/415 | 242/382.2 |
| 5,540,479 A * | 7/1996 | Thomas | B60N 2/757 | 297/113 |
| 5,558,404 A * | 9/1996 | Muzzy | B60N 2/763 | 297/411.38 |
| 5,636,899 A * | 6/1997 | Schiff | B60N 2/77 | 297/411.36 |
| 5,695,251 A * | 12/1997 | Scolari | A47C 1/025 | 297/353 |
| 5,794,879 A * | 8/1998 | Huber | B60R 22/415 | 242/382.2 |
| 5,823,624 A * | 10/1998 | Dahlbacka | A47C 1/03 | 297/411.36 |
| 5,908,221 A * | 6/1999 | Neil | A47C 1/03 | 297/411.36 |
| 5,931,401 A * | 8/1999 | Rink | B60R 21/01544 | 242/374 |
| 6,604,597 B2 * | 8/2003 | Fujii | B60R 22/44 | 180/268 |
| 6,655,626 B2 * | 12/2003 | Snyder | B60R 22/415 | 200/573 |
| 6,752,462 B1 * | 6/2004 | Kain | B60N 2/2812 | 297/411.38 |
| 6,805,513 B2 * | 10/2004 | Marquina | B60N 2/224 | 403/107 |
| 7,434,887 B1 * | 10/2008 | Hsien | A47C 1/03 | 297/411.36 |
| 7,530,289 B2 * | 5/2009 | Willemsen | G05G 1/015 | 74/512 |
| 7,735,766 B2 * | 6/2010 | Nomura | B60R 22/44 | 242/390.2 |
| 7,850,244 B2 * | 12/2010 | Salewski | B60N 2/757 | 297/411.32 |
| 8,840,175 B2 * | 9/2014 | Short | A47B 85/04 | 297/119 |
| 9,511,694 B2 * | 12/2016 | Mendicino | B60N 3/101 | |
| 2002/0024211 A1 * | 2/2002 | Yano | B60R 22/46 | 280/806 |
| 2002/0096591 A1 * | 7/2002 | Tanji | B60R 22/343 | 242/390.8 |
| 2002/0158162 A1 * | 10/2002 | Fujii | B60R 22/44 | 242/390.9 |
| 2002/0189880 A1 * | 12/2002 | Tanaka | B60R 22/44 | 180/268 |
| 2003/0234554 A1 * | 12/2003 | Maierholzner | B60N 2/793 | 296/153 |
| 2005/0200186 A1 * | 9/2005 | Schumacher | B60N 2/3047 | 297/411.38 |
| 2007/0205638 A1 * | 9/2007 | Schlecht | B60N 2/757 | 297/113 |
| 2007/0241603 A1 * | 10/2007 | Otto | B60N 2/943 | 297/411.38 |
| 2008/0277991 A1 * | 11/2008 | Liu | B60N 2/753 | 297/411.36 |
| 2009/0152926 A1 * | 6/2009 | Yeum | B60N 3/101 | 297/411.32 |
| 2011/0115275 A1 * | 5/2011 | von Rothkirch und Panthen | B60N 2/77 | 297/411.32 |
| 2013/0076096 A1 * | 3/2013 | Pacolt | B60N 2/767 | 297/411.38 |
| 2013/0113263 A1 * | 5/2013 | Yamada | B60N 2/02 | 297/423.19 |
| 2013/0181490 A1 * | 7/2013 | Lin | A47B 5/00 | 297/145 |
| 2015/0001909 A1 * | 1/2015 | Lorey | B60N 2/02 | 297/411.36 |
| 2015/0091318 A1 * | 4/2015 | Bohner | B60N 2/767 | 296/1.09 |
| 2017/0071345 A1 * | 3/2017 | Tsai | A47C 1/03 | |
| 2017/0291514 A1 * | 10/2017 | Nuss | A47C 7/54 | |
| 2017/0334324 A1 * | 11/2017 | Keller | B60N 2/767 | |
| 2018/0128026 A1 * | 5/2018 | Burgess | E05C 17/203 | |
| 2019/0389350 A1 * | 12/2019 | Dry | B60N 2/753 | |

* cited by examiner

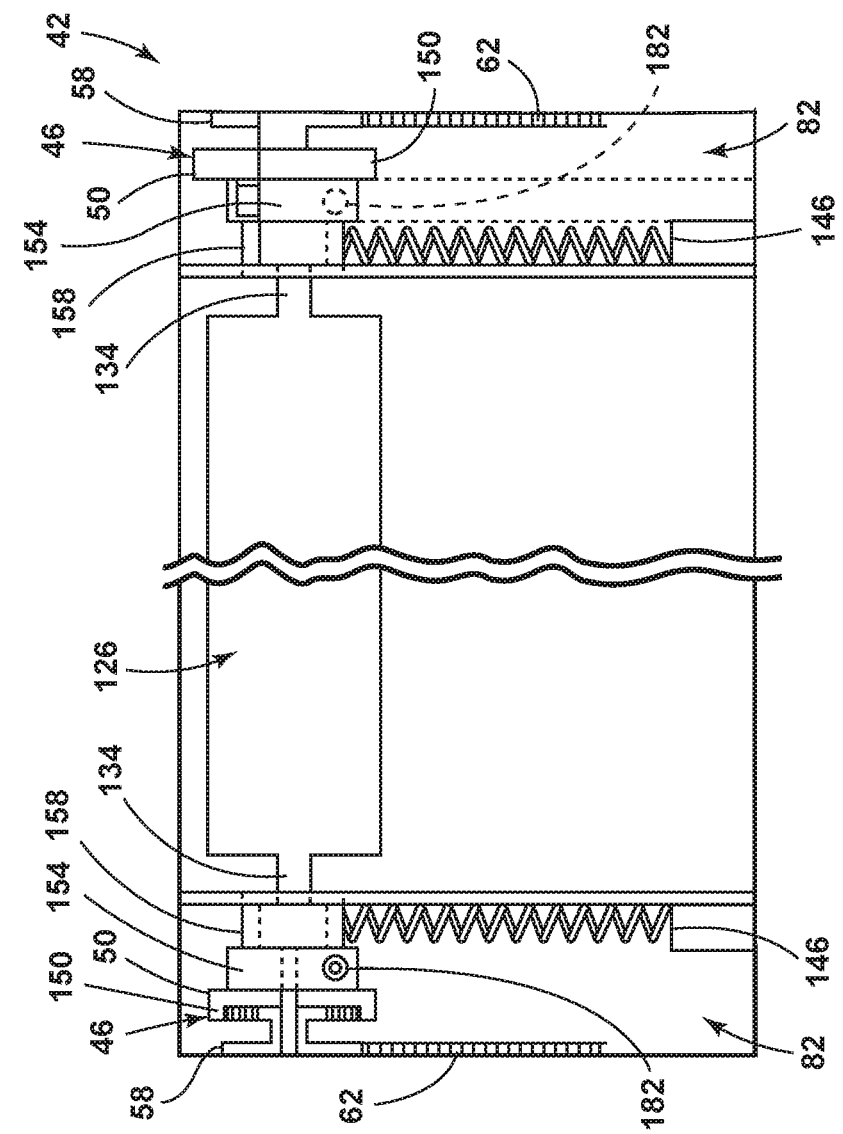
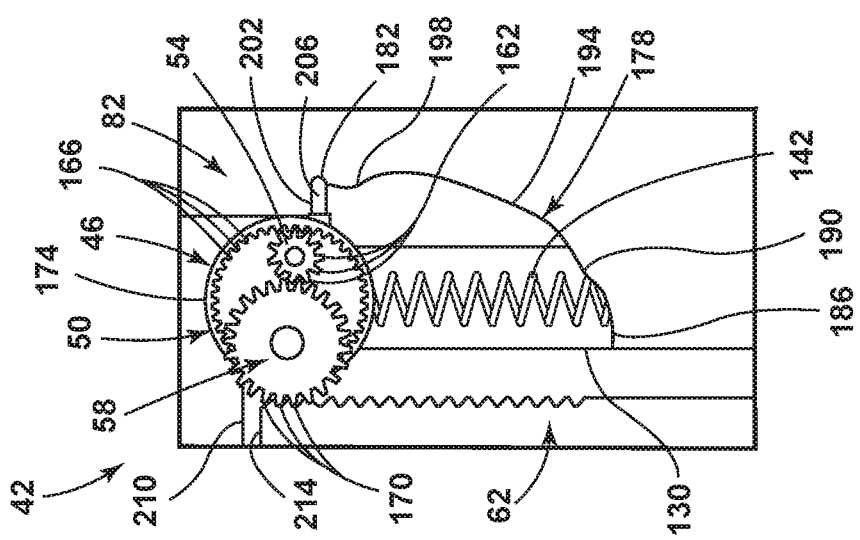
FIG. 7A
FIG. 7B

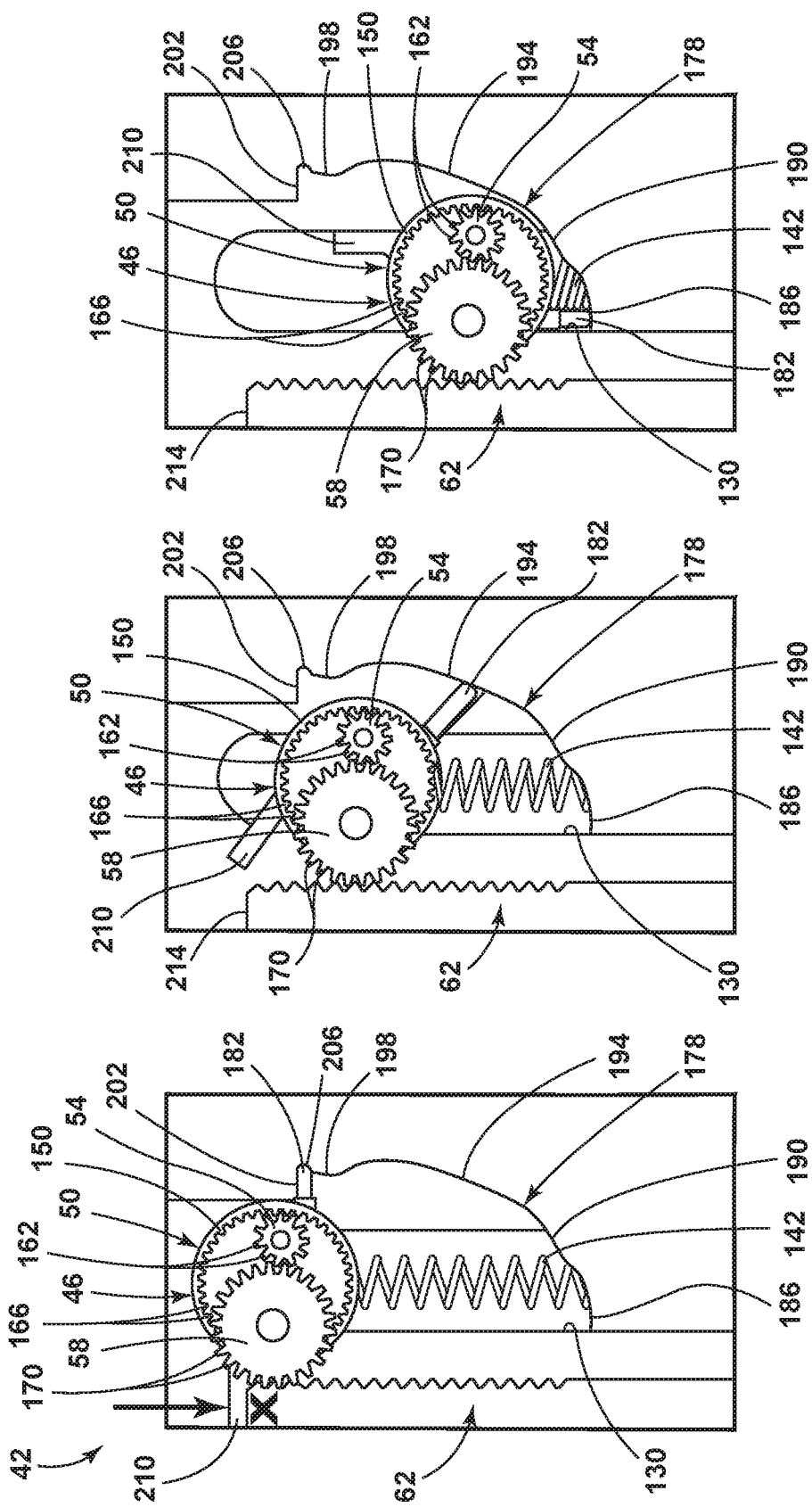

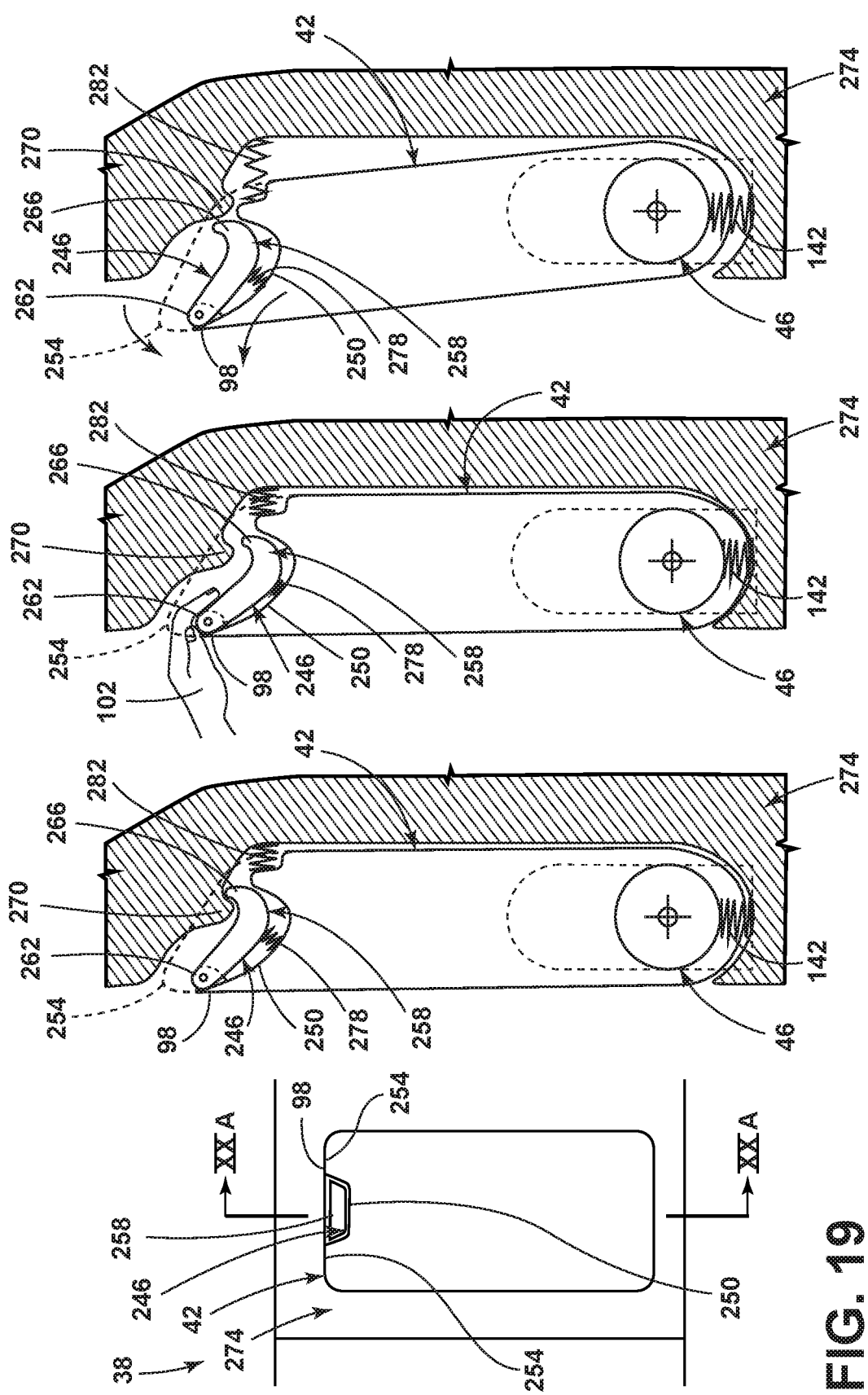

DEPLOYABLE ARMREST

FIELD OF THE INVENTION

The present disclosure generally relates to an armrest. More specifically, the present disclosure generally relates to a deployable armrest.

BACKGROUND OF THE INVENTION

Vehicles are often provided with a variety of comfort settings and features that improve a ride experience for users or occupants. However, execution of deployment and stowing operations for various features often remain simplistic and utilitarian. Accordingly, additional executions of the operations for various features are needed to provide the users and occupants with the best possible experience.

SUMMARY OF THE INVENTION

According to a first aspect of the present disclosure, an armrest includes a gear assembly with a crown gear directly coupled to the armrest that imparts rotational motion to the armrest, a planetary gear engaged with the crown gear, and a pinion gear coupled to the crown gear that imparts vertical motion of the entire gear assembly, and the armrest, along a rack.

Embodiments of the first aspect of the present disclosure can include any one or a combination of the following features:
 a mounting assembly having a ramp structure that is engaged by a protrusion on the crown gear;
 the protrusion interacts with the ramp structure such that deployment of the armrest is accomplished in a soft-open manner;
 the planetary gear includes a first planetary gear and a second planetary gear;
 teeth on one of the first planetary gear and the second planetary gear engages with teeth on the pinion gear, wherein the other of the first planetary gear and the second planetary gear is coaxially aligned with the pinion gear;
 a post of the planetary gear passes through a guide slot defined by the crown gear, wherein the guide slot guides the planetary gear through translational rotational motion between a stowed position and a deployed position of the armrest;
 a rotation axis of the pinion gear is axially offset from a rotation axis of the crown gear;
 the pinion gear extends beyond a circumference of the crown gear;
 a resilient member that biases the gear assembly in a vertically upward direction toward a deployed position of the armrest; and
 a retention assembly that retains the armrest in a stowed position.

According to a second aspect of the present disclosure, a vehicle seating assembly includes an armrest, a gear assembly, and a mounting assembly. The gear assembly includes a crown gear directly coupled to the armrest that imparts rotational motion to the armrest, a planetary gear engaged with the crown gear, and a pinion gear coupled to the crown gear that imparts vertical motion of the entire gear assembly, and the armrest, along a rack. The mounting assembly includes a ramp structure that is engaged by a protrusion on the crown gear.

Embodiments of the second aspect of the present disclosure can include any one or a combination of the following features:
 the protrusion interacts with the ramp structure such that deployment of the armrest is accomplished in a soft-open manner;
 the planetary gear includes a first planetary gear and a second planetary gear, wherein teeth on one of the first planetary gear and the second planetary gear engages with teeth on the pinion gear, and wherein the other of the first planetary gear and the second planetary gear is coaxially aligned with the pinion gear;
 a post of the planetary gear passes through a guide slot defined by the crown gear, wherein the guide slot guides the planetary gear through translational rotational motion between a stowed position and a deployed position of the armrest;
 a rotation axis of the pinion gear is axially offset from a rotation axis of the crown gear, wherein the pinion gear extends beyond a circumference of the crown gear; and
 a resilient member that biases the gear assembly in a vertically upward direction toward a deployed position of the armrest and a retention assembly that retains the armrest in a stowed position.

According to a third aspect of the present disclosure, a vehicle seating assembly includes an armrest positioned in a seatback and operable between a stowed position and a deployed position. The vehicle seating assembly also includes a gear assembly that includes a crown gear directly coupled to the armrest that imparts rotational motion to the armrest, a planetary gear engaged with the crown gear, and a pinion gear coupled to the crown gear that imparts vertical motion of the entire gear assembly, and the armrest, along a rack. The vehicle seating assembly further includes a mounting assembly that includes a ramp structure that is engaged by a protrusion on the crown gear such that deployment of the armrest is accomplished in a soft-open manner.

Embodiments of the third aspect of the present disclosure can include any one or a combination of the following features:
 the planetary gear includes a first planetary gear and a second planetary gear, wherein teeth on one of the first planetary gear and the second planetary gear engages with teeth on the pinion gear, and wherein the other of the first planetary gear and the second planetary gear is coaxially aligned with the pinion gear;
 a post of the planetary gear passes through a guide slot defined by the crown gear, wherein the guide slot guides the planetary gear through translational rotational motion between a stowed position and a deployed position of the armrest; and
 a rotation axis of the pinion gear is axially offset from a rotation axis of the crown gear, wherein the pinion gear extends beyond a circumference of the crown gear.

These and other aspects, objects, and features of the present invention will be understood and appreciated by those skilled in the art upon studying the following specification, claims, and appended drawings.

BRIEF DESCRIPTION OF THE DRAWINGS

In the drawings.

FIG. 7A is a side view of the mounting assembly, illustrating the interaction between the gear assembly and the mounting assembly, according to one example;

FIG. 7B is a front view of the armrest, illustrating the interaction between the armrest, the gear assembly, and the mounting assemblies, according to one example;

FIG. 12A is a side view of the armrest, illustrating the interaction between the gear assembly and the mounting assembly when the armrest is in the fully-deployed position, according to one example;

FIG. 12B is a side view of the armrest, illustrating the interaction between the gear assembly and the mounting assembly when the armrest is in the partially-deployed position, according to one example;

FIG. 12C is a side view of the armrest, illustrating the interaction between the gear assembly and the mounting assembly when the armrest is in a stowed position, according to one example;

FIG. 19 is a front view of the armrest, according to one example;

FIG. 20A is a cross-sectional view of the armrest, taken along line XXA-XXA of FIG. 19, illustrating a retention assembly in an engaged position, according to one example;

FIG. 20B is a cross-sectional view of the armrest, taken along line XXA-XXA of FIG. 19, illustrating the retention assembly being actuated by a user, according to one example;

FIG. 20C is a cross-sectional view of the armrest, taken along line XXA-XXA of FIG. 19, illustrating the retention assembly in a disengaged position, according to one example;

DETAILED DESCRIPTION OF THE PREFERRED EMBODIMENTS

Figure 1:
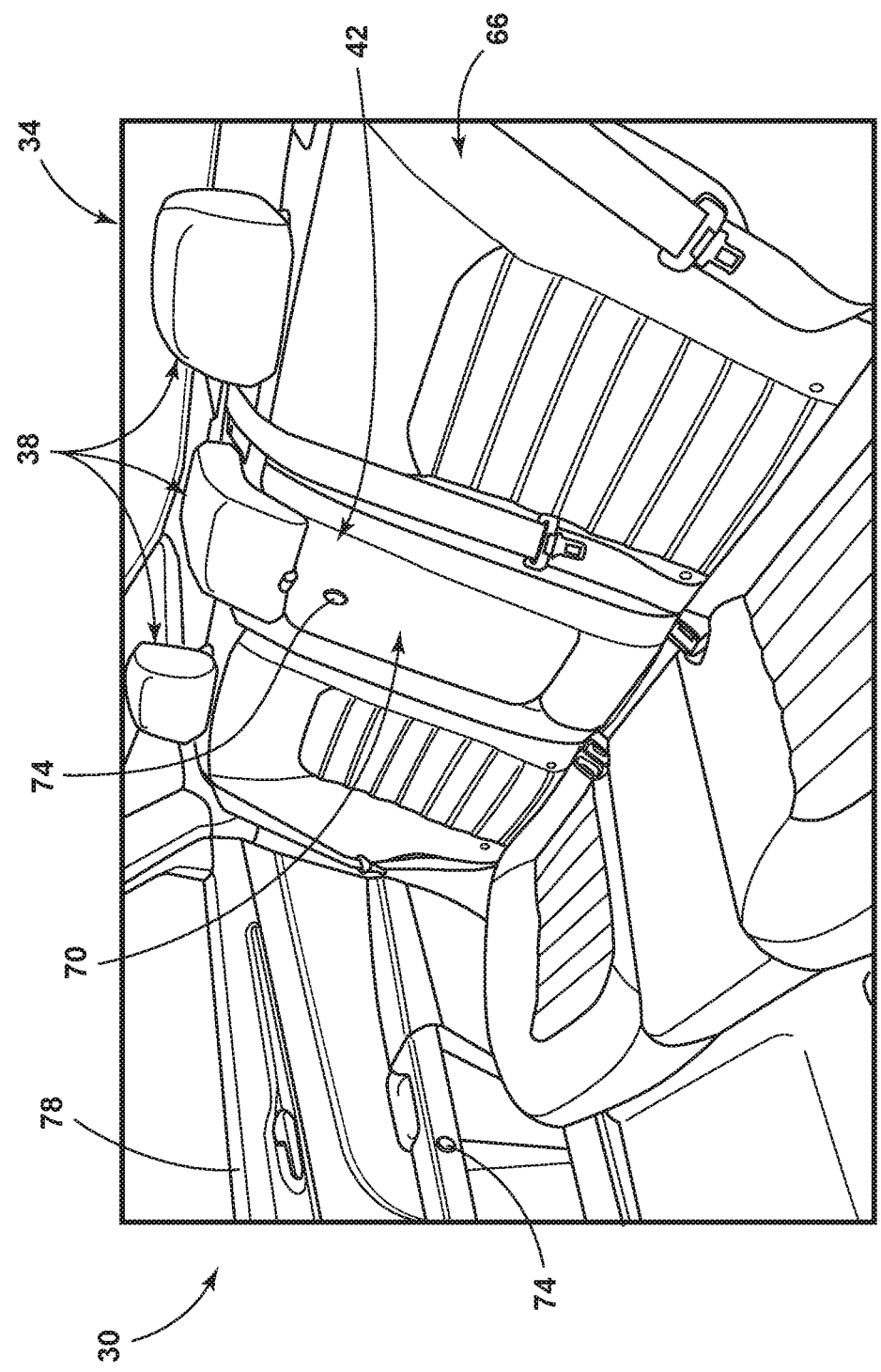
FIG. 1 is a side perspective view of a cabin of a vehicle, illustrating a rearward row of seats, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an armrest. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 3:
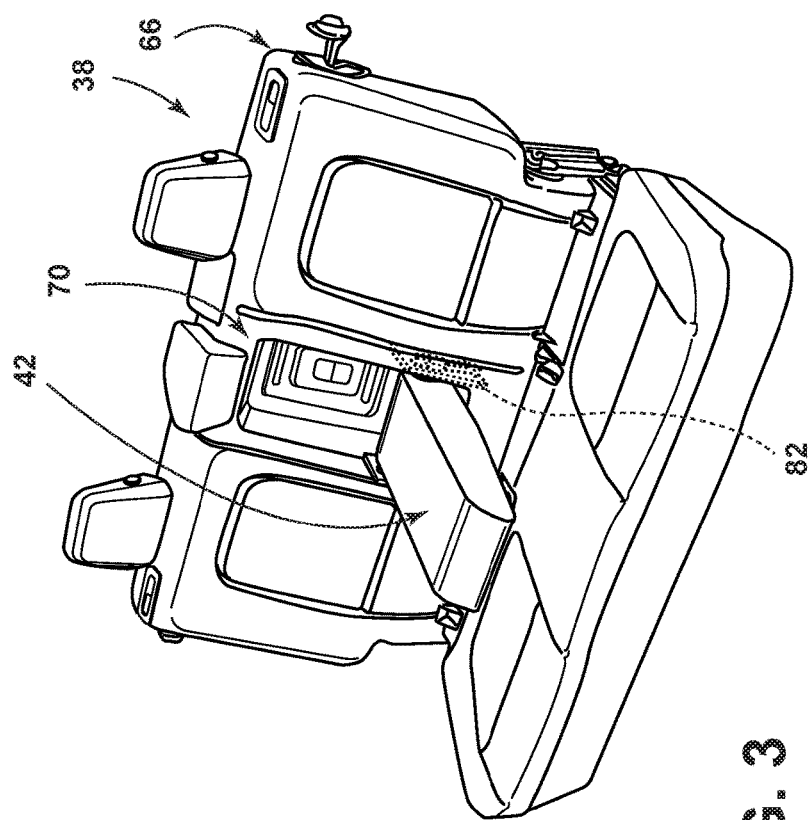
FIG. 3 is a front perspective view of the rearward row of seats, illustrating the armrest in a fully-deployed position, according to one example.
Figure 2:
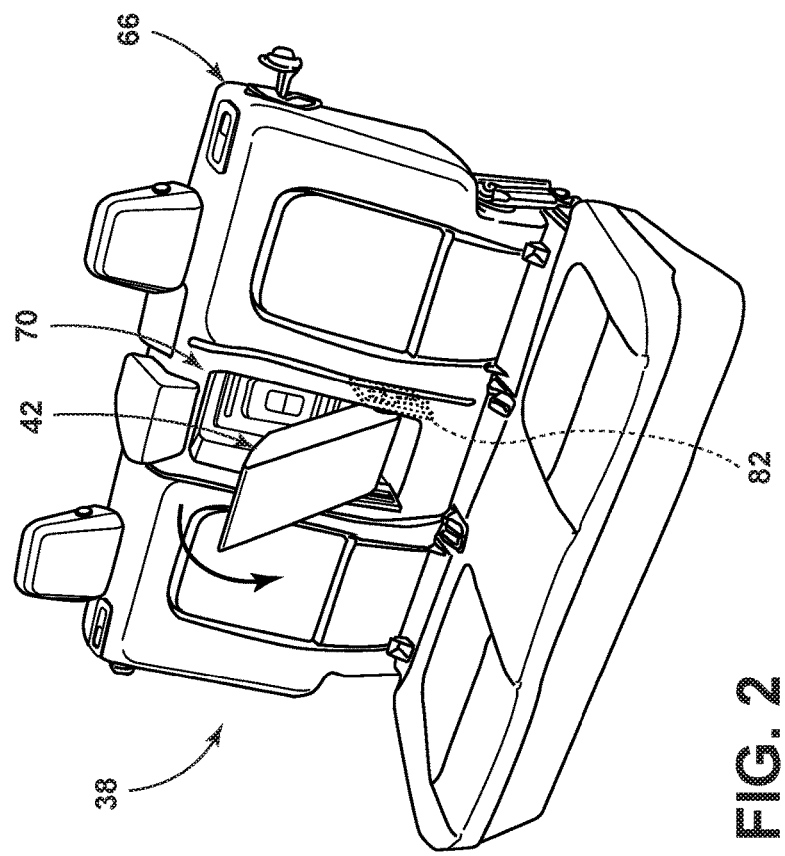
FIG. 2 is a front perspective view of the rearward row of seats, illustrating an armrest in a partially-deployed position, according to one example.

Referring to FIGS. 1-22C, reference numeral 30 generally designates a vehicle. The vehicle 30 includes an interior or cabin 34. The cabin 34 is often equipped with one or more vehicle seating assemblies 38. In one example, the vehicle seating assemblies 38 can be interconnected to form a bench seat assembly, such as that depicted in FIG. 1. Alternatively, the vehicle seating assemblies 38 may be independent seating assemblies, such as captain's chairs. The vehicle 30 is equipped with an armrest 42. The armrest 42 includes a gear assembly 46 that aids in transitioning the armrest 42 from a stowed position (FIG. 1) to a deployed position (FIG. 3). The gear assembly 46 includes a crown gear 50 that is directly coupled to the armrest 42. Rotational motion applied to the crown gear 50 is imparted to the armrest 42. The gear assembly 46 also includes a planetary gear 54 that engages with the crown gear 50. A pinion gear 58 is coupled to the crown gear 50 and rotational motion of the pinion gear 58 imparts, or is translated into, vertical motion of the entire gear assembly 46. The vertical motion imparted or translated to the crown gear 50 is in turn imparted or translated into vertical motion of the armrest 42. The rotational motion of the pinion gear 58 is translated into vertical motion by an engagement between the pinion gear 58 and a rack 62.

Referring again to FIGS. 1-3, a rearward row of seats 66 is equipped with the armrest 42. In the depicted example, the armrest 42 is positioned as a seatback 70 in a center seating position of the rearward row of seats 66 when the armrest 42 is in the stowed position. The center seating position in the rearward row of seats 66 may alternatively be referred to as a twenty-percent (20%) seat while the vehicle seating assemblies 38 that flank the twenty-percent seat may be referred to as forty-percent (40%) seats. In general, the rearward row of seats 66 may be referred to as a bench seat. Deployment of the armrest 42 from the stowed position to the deployed position may be accomplished manually or by a powered deployment. For example, an activation button 74 can be provided on the seatback 70 and/or on a door 78 of the vehicle 30. The activation button 74 can be actuated by a user to initiate deployment or stowing of the armrest 42 in examples where power deployment is employed. Alternatively, in examples where manual deployment is employed, actuation of the activation button 74 can result in the release of a locking assembly or a retention assembly, as will be discussed in more detail below. Upon release of the locking assembly or the retention assembly, the armrest 42 can be automatically deployed without requiring a powered deployment. For example, one or more biasing forces may be applied to the armrest 42 that bias the armrest 42 toward the deployed position such that upon release of the locking assembly or the retention assembly, the armrest 42 transitions from the stowed position to the deployed position. Once the armrest 42 is in the deployed position, users that are seated in close proximity to the armrest 42 can utilize the armrest 42 as a support upon which they can place their arms to improve comfort. Stowing the armrest 42 from the deployed position can be accomplished in manual operation by the user applying an upward force to an underside of the deployed armrest 42. Stowing the armrest 42 from the deployed position can be accomplished in powered operation by the user actuating the activation button 74 such that a retraction or stowing of the armrest 42 is initiated. Movement of the armrest 42 between the stowed position and the deployed position can be guided by a mounting assembly 82 that couples the armrest 42 to the vehicle seating assembly 38, which will be discussed in further detail below.

Figure 4A:
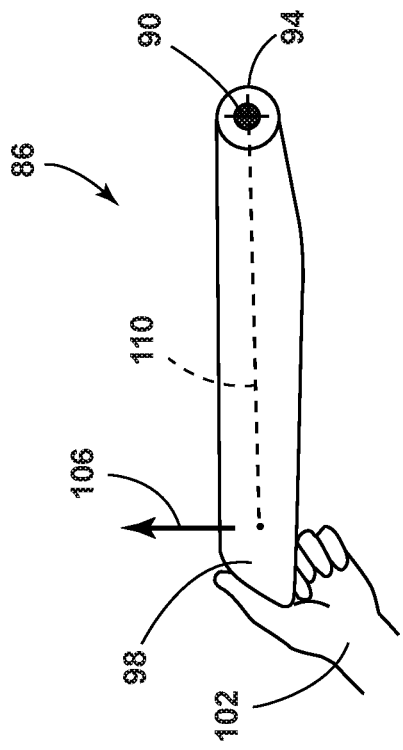
FIG. 4A is a side view of the armrest and a gear assembly, illustrating a manual actuation of the armrest, according to one example.
Figure 4B:
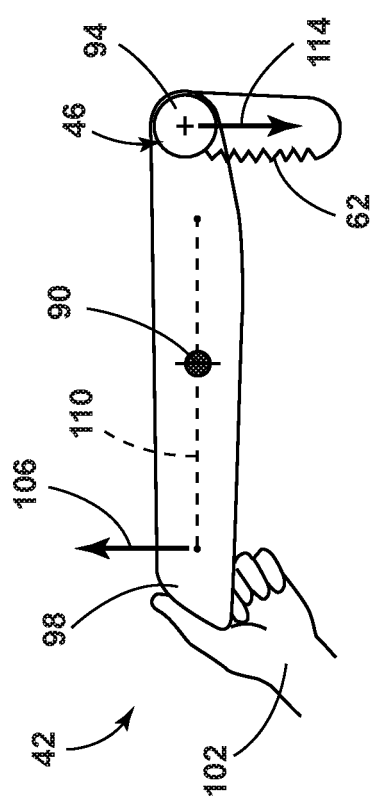
FIG. 4B is a side view of a conventional armrest, illustrating a manual actuation of the conventional armrest, according to one example.
Figure 5A:
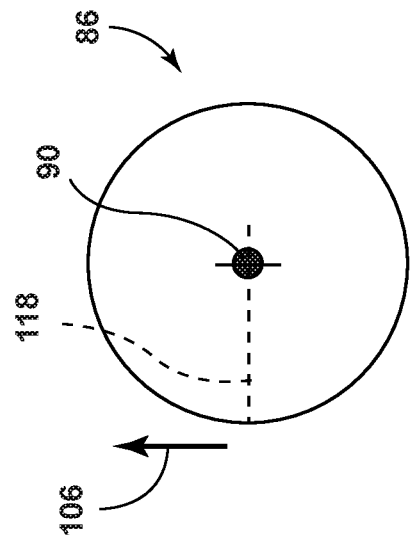
FIG. 5A is a side view of the armrest and the gear assembly, illustrating a powered actuation of the armrest, according to one example.
Figure 5B:
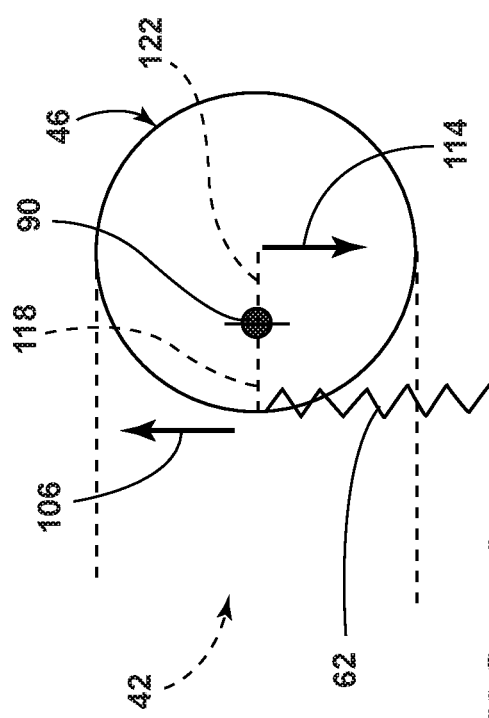
FIG. 5B is a side view of the conventional armrest, illustrating a powered actuation of the armrest, according to one example.
Figure 6:
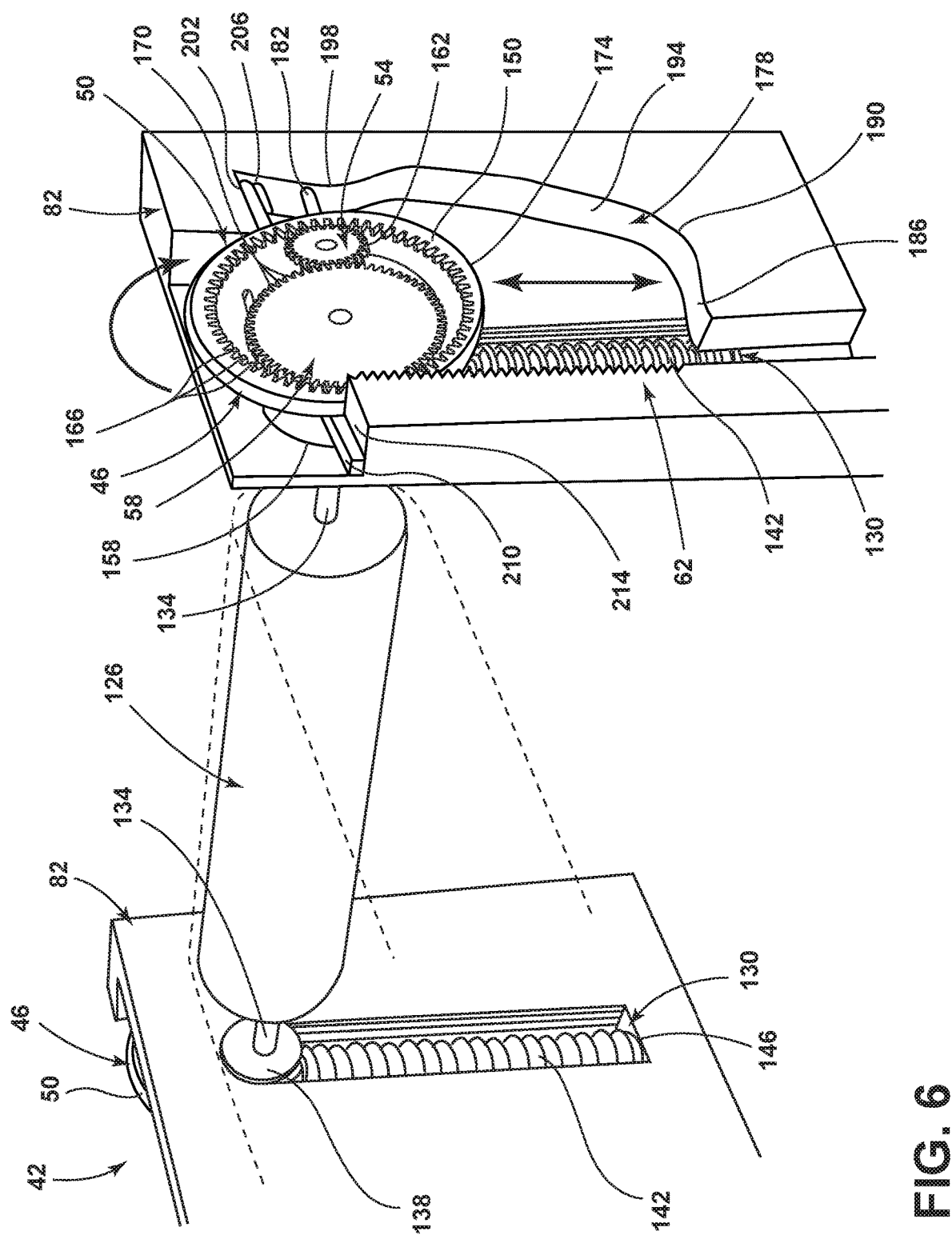
FIG. 6 is a front perspective view of mounting assemblies of the armrest, illustrating the interaction between the armrest, the gear assembly, and the mounting assemblies, according to one example.
Figure 9:
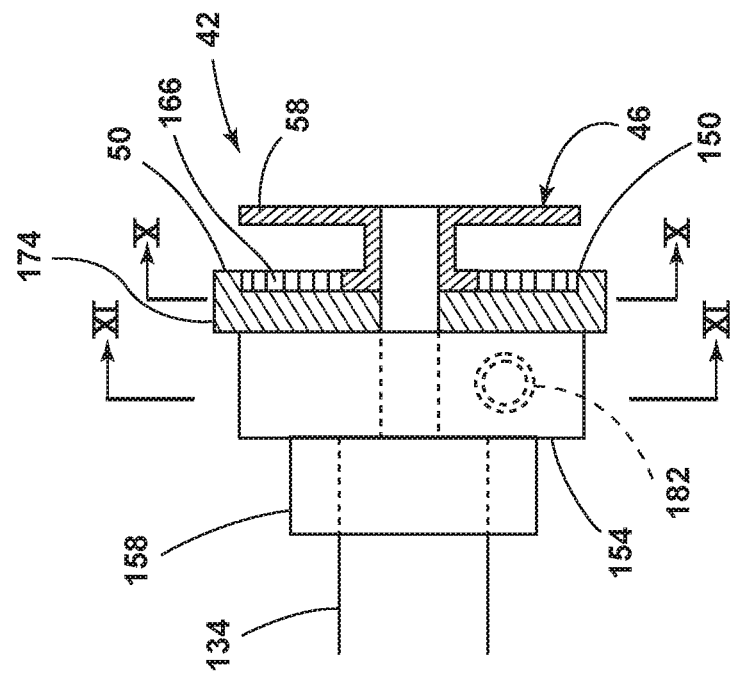
FIG. 9 is a schematic view of the armrest, illustrating an interaction between the gear assembly and the armrest, according to one example.
Figure 8:
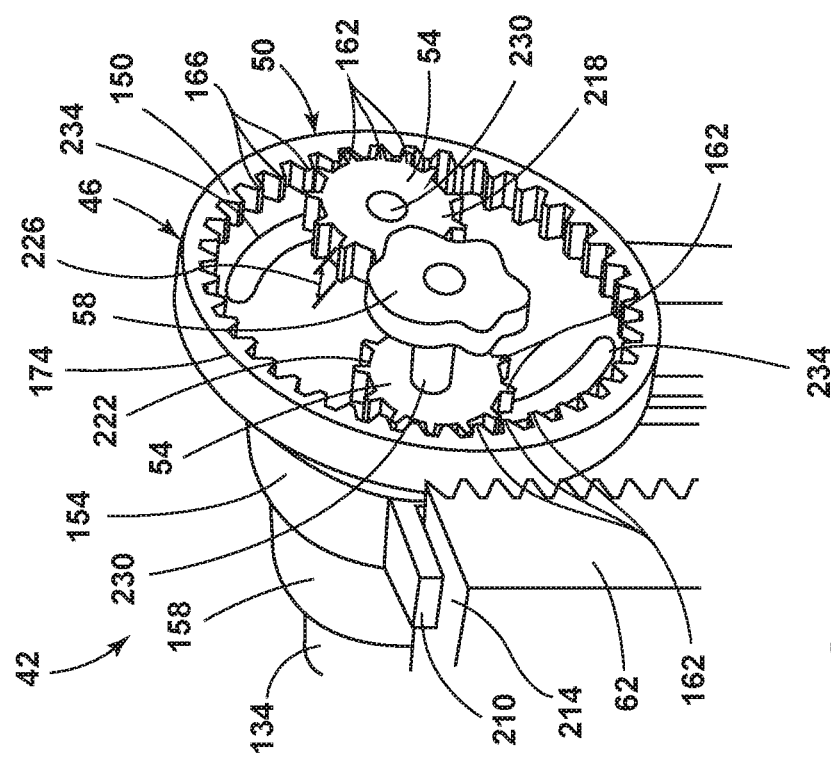
FIG. 8 is a side perspective view of the gear assembly, illustrating various components of the gear assembly, according to one example.
Figure 11:
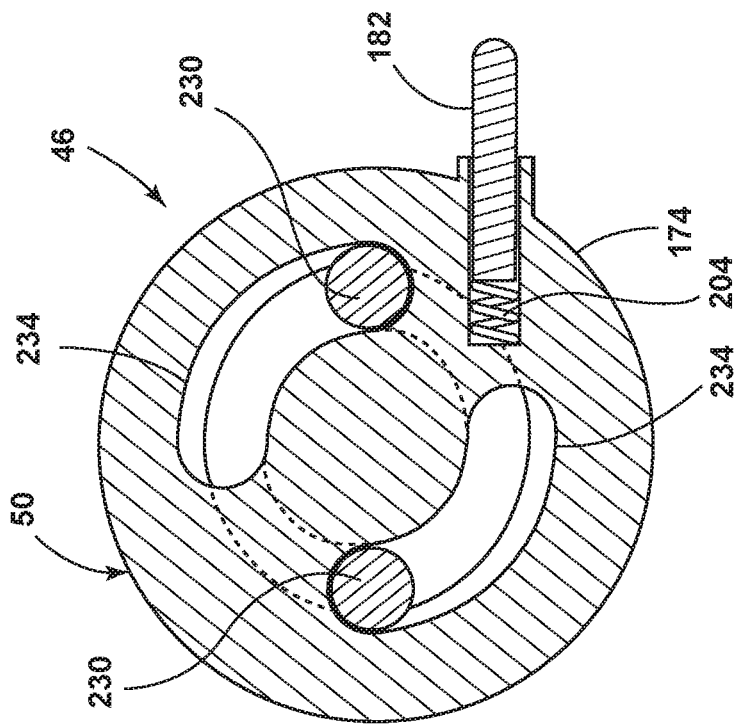
FIG. 11 is a cross-sectional view of the gear assembly, taken along line XI-XI of FIG. 9, illustrating the crown gear and the protrusion of the crown gear, according to one example.
Figure 10:
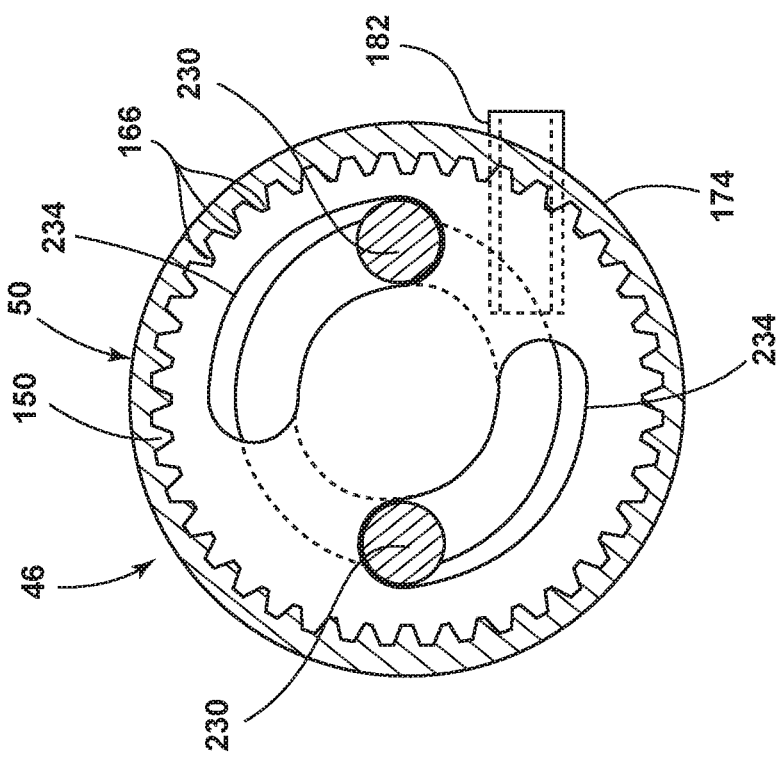
FIG. 10 is a cross-sectional view of the gear assembly, taken along line X-X of FIG. 9, illustrating a crown gear and a protrusion of the crown gear, according to one example.

Referring now to FIGS. 4A-5B, the armrest 42 of the present disclosure is compared to a conventional armrest 86 (FIGS. 4B and 5B). The armrest 42 of the present disclosure can be actuated between the stowed position and the deployed position with less effort than the effort required to actuate the conventional armrest 86. The decreased effort in the actuation of the armrest 42 is at least partially due to a shifting of a pivot point 90 of the armrest 42 along a length of the armrest 42 such that the pivot point 90 is positioned away from a coupled end 94 of the armrest 42. The coupled end 94 is intended to refer to the end of the armrest 42 or the conventional armrest 86 that is coupled to a support structure, such as the vehicle seating assembly 38 (FIG. 1). Accordingly, the end of the armrest 42 or the conventional armrest 86 that is opposite to the coupled end 94 may be referred to as a free end 98. A user 102 exerts an upward force 106 on the free end 98 of the armrest 42 or the conventional armrest 86 to transition from the deployed position to the stowed position. The upward force 106 that the user 102 exerts to transition from the deployed position to the stowed position is at least partially dependent upon the location of the pivot point 90 and a distance 110 between the pivot point 90 and the free end 98. The pivot point 90 in the conventional armrest 86 is static and the distance 110 between the pivot point 90 and the free end 98 of the conventional armrest 86 is greater than the distance 110 between the pivot point 90 and the free end 98 of the armrest 42. The pivot point 90 in the armrest 42 is dynamic and the distance 110 between the pivot point 90 and the free end 98 of the armrest 42 is less than the distance 110 between the pivot point 90 and the free end 98 of the conventional armrest 86. Accordingly, the user 102 may exert less of the upward force 106 with the armrest 42 than is required for the conventional armrest 86. Additionally, the armrest 42 can be actuated with a soft-close execution due to the pivot point 90 being dynamic. Reference to the pivot point 90 of the armrest 42 being dynamic is intended to refer to the pivot point 90 moving horizontally and vertically through space as the armrest 42 is transitioned between the stowed position and the deployed position. However, the dynamic nature of the pivot point 90 on the armrest 42 is not intended to refer to the pivot point 90 moving relative to the coupled end 94 and the free end 98. For example, upon application of the upward force 106 to the free end 98 of the armrest 42, the upward motion of the armrest 42 induces a downward motion with an associated downward force 114 along the rack 62. The downward motion of the armrest 42 at the coupled end 94 is facilitated by rotational motion of the gear assembly 46. More specifically, the downward motion of the armrest 42 at the coupled end 94 is facilitated by rotational motion of the pinion gear 58 along the rack 62 (see FIG. 6).

Referring again to FIGS. 4A-5B, in examples where the deployment and/or stowing of the armrest 42 is powered (FIGS. 5A and 5B), the pivot point 90 may be altered when compared to the examples where manual operation of the armrest is employed (FIGS. 4A and 4B). The gear assembly 46 is generally depicted in FIG. 5A and operates in substantially the same way in the powered examples as in the manual examples. One difference in the operation of the powered examples of the armrest 42 and gear assembly 46 resides in the positioning of the upward force 106 and the downward force 114. Rather than the upward force 106 being applied at the free end 98 of the armrest 42, the upward force 106 is applied proximate to an outer extent (e.g., outer diameter of the crown gear 50 and/or the pinion gear 58) or circumference of the gear assembly 46 in the powered examples. A distance 118 between the pivot point 90 and the upward force 106 may be decreased with the armrest 42 when compared to the distance 118 between the pivot point 90 and the upward force 106 in the conventional armrest 86. The distance 118 between the pivot point 90 and the upward force 106 may be substantially equal to a distance 122 between the pivot point 90 and the downward force 114. In some examples, the downward force 114 may be generally aligned with a center of the gear assembly 46 and/or generally aligned with a center of a component of the gear assembly 46 (e.g., a center of the crown gear 50). Accordingly, the pivot point 90 for the armrest 42 in powered examples is radially displaced from the center of the gear assembly 46. However, in various examples the pivot point 90 for the armrest 42 in powered and/or manual examples may be generally aligned with a center of one or more of the components of the gear assembly 46 while the pivot point 90 remains radially displaced from the center of the gear assembly 46. For example, the pivot point 90 may be radially displaced from the center of the gear assembly 46 while generally aligned with a center of the planetary gear 54 and/or the pinion gear 58. In some examples, the pivot point 90 of the armrest 42 in powered and/or manual examples may be referred to as a pivot diameter relative to the gear assembly 46 due to the pivot point 90 being dynamic for the armrest 42 when compared to the static pivot point 90 of the conventional armrest 86. In powered examples, the upward and downward forces 106, 114 may be resultant forces that are induced by a rotational force applied by a motor to the gear assembly 46. For example, the motor may apply a rotational force to the crown gear 50 that induces the upward and downward forces 106, 114 (e.g., by way of the gear assembly 46). The upward and downward forces 106, 114 are referred to with regard to a stowing operation of the armrest 42 from a deployed position. It is contemplated that the upward and downward forces 106, 114 may be reversed to transition the armrest 42 from the stowed position to the deployed position. While the direction of the upward and downward forces 106, 114 may change based on whether the action being undertaken is a stowing action or a deploying action, the magnitude of the upward and downward forces 106, 114 may remain substantially the same.

Referring to FIGS. 6-12C, the gear assembly 46 and the mounting assembly 82 are shown in further detail, according to an example of the armrest 42 for manual operation. The gear assembly 46 includes the crown gear 50, one or more of the planetary gears 54, and the pinion gear 58. The gear assembly 46 can be directly coupled to the armrest 42. For example, the gear assembly 46 can directly couple to an armrest support structure 126. In the depicted example, the crown gear 50 directly couples to the armrest 42 such that rotational motion of the crown gear 50 is imparted to the armrest 42. Similarly, rotational motion of the armrest 42, such as deployment and stowing actions, is imparted to the crown gear 50. The mounting assembly 82 defines a vertical slot 130 through which the armrest 42 and the gear assembly 46 are coupled to one another. A coupling portion 134 of the armrest support structure 126 can extend through the vertical slot 130 to engage with the gear assembly 46. The coupling portion 134 may include a flange 138 coupled thereto and positioned between the mounting assembly 82 and the armrest support structure 126. The flange 138 is sized and positioned to laterally retain the armrest 42 between the mounting assemblies 82. Accordingly, a diameter of the flange 138 is greater than a width of the vertical slot 130. A resilient member 142 may be positioned within the vertical slot 130 between a floor 146 of the vertical slot 130 and an underside of the gear assembly 46 and/or an underside of the coupling portion 134. In the depicted example, the resilient member 142 biases the gear assembly 46 in a vertically upward direction toward the deployed position of the armrest 42. The resilient member 142 can be any suitable biasing member, including but not limited to, springs, coil springs, gas pistons, magnets that are arranged in repelling orientation, clock springs provided in the gear assembly 46, biased barrel hinges provided in the gear assembly 46, and so on.

Referring again to FIGS. 6-12C, the coupling portion 134 may generally define a rotation axis of the crown gear 50. The crown gear 50 may include a geared portion 150 and a carrier portion 154. The armrest 42 may include a spacer 158 between the carrier portion 154 of the crown gear 50 and the mounting assembly 82. The spacer 158 can provides at least some lateral retention to the armrest 42 and/or the gear assembly 46 as well as decreasing the likelihood for binding of the gear assembly 46 as the gear assembly 46 traverses vertical and rotational displacements during the transitions between the stowed and deployed positions. The spacer 158 may be passively coupled to the coupling portion 134 and/or the carrier portion 154 such that the spacer 158 can rotate independently from the coupling portion 134 and/or the carrier portion 154. Accordingly, as the armrest 42 is transitioned between the stowed position and the deployed position, the spacer 158 can provide lateral retention and smooth operation of the armrest 42, as well as prevent binding or sticking of the armrest 42. Said another way, the coupling portion 134 may pass through a center bore of the spacer 158 such that the coupling portion 134 rotates freely within the center bore of the spacer 158. In some examples, the resilient member 142 may be coupled to an underside of the spacer 158 such that the biasing force of the resilient member 142 is constantly provided to the spacer 158 and the spacer 158 may transmit the biasing force (e.g., a vertically upward force) to the armrest 42 and/or gear assembly 46 by way of the coupling portion 134. In such an example, the resilient member 142 is thus acting on a portion of the armrest 42 that is not experiencing rotational displacement and therefore, the resilient member 142 is less likely to experience unintentional decoupling from the armrest 42 that can result in a failure mode of the armrest 42.

Referring further to FIGS. 6-12C, the planetary gear 54 of the gear assembly 46 can engage with the crown gear 50 and/or the pinion gear 58. More specifically, teeth 162 on the planetary gear 54 can engage with teeth 166 on the crown gear 50 and/or teeth 170 on the pinion gear 58. For example, the teeth 162 on the planetary gear 54 can engage with the teeth 166 on the crown gear 50 and the teeth 170 on the pinion gear 58 such that rotational motion of the crown gear 50 is transmitted to the pinion gear 58 and rotational motion of the pinion gear 58 is transmitted to the crown gear 50. Alternatively, the teeth 162 on the planetary gear 54 may engage with either the teeth 166 on the crown gear 50 or the teeth 170 on the pinion gear 58. In various examples, the pinion gear 58 can extend beyond a circumference 174 of the crown gear 50. In such examples, the pinion gear 58 can be laterally offset from the crown gear 50 so that the crown gear 50 does not limit the mobility of the pinion gear 58. Said another way, the pinion gear 58 may be offset in a vehicle side-to-side direction, as opposed to a fore-aft direction, such that lateral clearance is provided between the crown gear 50 and the pinion gear 58. Such an arrangement may be beneficial to allow the gear assembly 46, especially the crown gear 50, to rotate and move vertically without risking binding, catching, or unintended contact between the gear assembly 46 and the mounting assembly 82. The extension of the pinion gear 58 beyond the circumference 174 of the crown gear 50 allows the teeth 170 on the pinion gear 58 to engage with the rack 62 without impeding the free rotation of the remainder of the gear assembly 46 and ultimately the armrest 42. In some examples, a rotation axis of the pinion gear 58 is axially or radially offset from the rotation axis of the crown gear 50.

Referring still further to FIGS. 6-12C, the mounting assembly 82 can include a ramp structure 178 that is engaged by a protrusion 182 on the crown gear 50. The ramp structure 178 can include a lower end 186, a first projection 190, an arcuate section 194, a second projection 198, and an upper end 202. As the armrest 42 transitions between the stowed position and the deployed position, the protrusion 182 positively and continuously engages with a surface of the ramp structure 178. In various examples, the positive and continuous engagement between the protrusion 182 and the ramp structure 178 can be accomplished by a biasing member 204 (e.g., a spring, coil spring, magnets in repelling arrangement, etc.) that biases the protrusion 182 to an extended position. Accordingly, the protrusion 182 can remain engaged with the surface of the ramp structure 178 despite a distance between the gear assembly 46 and the ramp structure 178 being variable in vertical and horizontal directions during the transition of the armrest 42 between the stowed position and the deployed position. The engagement between the protrusion 182 and the ramp structure 178 will now be described as the armrest 42 transitions from the stowed position to the deployed position. When the armrest 42 is in the stowed position, the protrusion 182 is engaged with the lower end 186 of the ramp structure. The armrest 42 can be retained in the stowed position by the first projection 190, which extends toward the gear assembly 46 to provide an impediment to traversal of the protrusion 182 along the ramp structure 178. In various examples, a lock assembly or release assembly may also be provided to retain the armrest 42 in the stowed position. When the user initiates deployment manually by either pulling on the free end 98 of the armrest 42 or by disengaging the lock or release assembly, then the force applied by the user or the weight of the armrest 42 enables the protrusion 182 to overcome the barrier of the first projection 190 and transition to the arcuate section 194. The arcuate section 194 is configured to provide the least resistance to movement of the gear assembly 46 such that deployment of the armrest 42 can be accomplished without further action from the user. However, the engagement between the protrusion 182 and the ramp structure 178, such as the arcuate section 194, provides sufficient resistance to movement of the gear assembly 46 such that deployment the armrest 42 is accomplished in a soft-open manner. As the protrusion 182 traverses the arcuate section 194, the protrusion 182 approaches the second projection 198. The second projection 198 can provide the greatest barrier or resistance to movement of the gear assembly 46 such that the armrest 42 decelerates during deployment from the stowed position as the armrest 42 nears the final deployed position. The inertia that the armrest 42 has accumulated during the deployment may be sufficient for the protrusion 182 to overcome the barrier to movement provided by the second projection 198. Alternatively, the second projection 198 may halt movement of the gear assembly 46 such that the user initiates the final transition over the second projection 198 to an alcove 206 defined by the ramp structure 178 between the second projection 198 and the upper end 202 (e.g., by the user resting their arm upon the armrest 42). Regardless of whether inertia or the user accomplishes the final transition of the protrusion 182 into the alcove 206, the protrusion 182 is retained within the alcove 206 and directly abuts the upper end 202 of the ramp structure 178 when the armrest 42 is in the fully deployed position. Accordingly, downward pressure applied by the user resting their arm upon the armrest 42 or placing an item in a storage compartment (e.g., cup holder) of the armrest 42 is transferred from the gear assembly 46 to the mounting assembly 82. Therefore, the various geared components of the gear assembly 46, such as the crown gear 50, the planetary gear 54, and the pinion gear 58, are prevented from carrying loads that exceed the weight of the armrest 42 alone. The gear assembly 46 may be additionally provided with a tab 210 that extends from the gear assembly 46 to engage with a top surface 214 of the rack 62 when the armrest 42 is in the fully deployed position. In examples that include the tab 210, the tab 210 may share the loads applied to the armrest 42 by the user with the protrusion 182. Alternatively, the tab 210 may carry the entirety of loads applied to the armrest by the user when the armrest 42 is in the fully deployed position. The tab 210 may extend from the crown gear 50, the geared portion 150 of the crown gear 50, the carrier portion 154 of the crown gear 50, and/or the pinion gear 58. It may be beneficial for the tab 210 to extend from the crown gear 50 or a portion of the crown gear 50 in examples where the crown gear 50 and the armrest support structure 126 are directly coupled so that any additional loads applied to the armrest 42 and transmitted to the armrest support structure 126 and the crown gear 50 are prevented from being transferred to the teeth 162, 166, 170 of any of the components of the gear assembly 46. Accordingly, the teeth 162, 166, 170 are prevented from unnecessary wear and tear as well as being prevented from carrying loads that exceed the loads the teeth 162, 166, 170 were designed to bear.

Referring yet again to FIGS. 6-12C, the planetary gear 54 can include a first planetary gear 218 and a second planetary gear 222. In one example, the teeth 162 on the first planetary gear 218 can engage with the teeth 170 on the pinion gear 58. The teeth 162 on the first planetary gear 218 can also engage with the teeth 166 on the crown gear 50. In such an example, a face width 226 of the teeth 162 on the first planetary gear 218 may be sized to simultaneously engage with the teeth 166 on the crown gear 50 and the teeth 170 on the pinion gear 58. Additionally or alternatively, the second planetary gear 222 can be coaxially aligned with the pinion gear 58 such that rotational motion imparted to the second planetary gear 222 by the crown gear 50 is transmitted to the pinion gear 58. The transmitted rotational motion that is experienced by the pinion gear 58 then results in rotational motion of the pinion gear 58 and traversal of the pinion gear 58 along the rack 62. The traversal of the pinion gear 58 along the rack 62 results in vertical actuation of the gear assembly 46 within the vertical slot 130 in the mounting assembly 82. In various examples, a post 230 of the planetary gear 54 may pass through a guide slot 234 that is defined by the crown gear 50. In examples that employ more than one planetary gear 54, each of the planetary gears 54 can be provided with a separate post 230 that passes through an associated guide slot 234. The guide slot 234 guides the post 230 and ultimately the planetary gear 54 through translational rotational motion between the stowed position and the deployed position of the armrest 42. In the depicted example of FIG. 8, the post 230 of the second planetary gear 222 extends outward from the second planetary gear 222 to additionally support the pinion gear 58. Accordingly, the pinion gear 58 and the second planetary gear 222 share a rotational axis and are coaxially aligned.

Referring now to FIGS. 13-18, the armrest 42 is depicted as powered or motor-driven according to various examples of the present disclosure. The examples of the armrest 42 where the transitions between the stowed position and the deployed position are powered or motor-driven may omit the ramp structure 178 and/or the protrusion 182. The soft-open that is provided by the ramp structure 178 and the protrusion 182 in the examples of the armrest 42 where the transitions between the stowed position and the deployed position are executed in a manual fashion can be accomplished by a motor 238 that is provided in the powered examples of the armrest 42. For example, the motor 238 may be provided with an arcuate or parabolic power curve such that when movement of the armrest 42 is initiated and as the armrest 42 approaches the stowed or deployed position, the speed of the motor 238 is decreased. The gear assembly 46 may be provided with the tab 210 that extends from the gear assembly 46 to engage with the top surface 214 of the rack 62 when the armrest 42 is in the fully deployed position. In examples that include the tab 210, the tab 210 may share the loads applied to the armrest 42 by the user with the motor 238. For example, the motor 238 can be provided with linkages, gears, physical stops, and the like to prevent transmission of loads from the armrest 42 to the gear assembly 46 and/or the motor 238 when the user rests their arm upon the deployed armrest 42. Alternatively, the tab 210 may carry the entirety of loads applied to the armrest by the user when the armrest 42 is in the fully deployed position. The tab 210 may extend from the crown gear 50, the geared portion 150 of the crown gear 50, the carrier portion 154 of the crown gear 50, and/or the pinion gear 58. It may be beneficial for the tab 210 to extend from the crown gear 50 or a portion of the crown gear 50 in examples where the crown gear 50 and the armrest support structure 126 are directly coupled (e.g., by the coupling portion 134) so that any additional loads applied to the armrest 42 and transmitted to the armrest support structure 126 and the crown gear 50 are prevented from being transferred to the teeth 162, 166, 170 of any of the components of the gear assembly 46. Accordingly, the teeth 162, 166, 170 are prevented from unnecessary wear and tear as well as being prevented from carrying loads that exceed the loads the teeth 162, 166, 170 were designed to bear.

Figure 14:
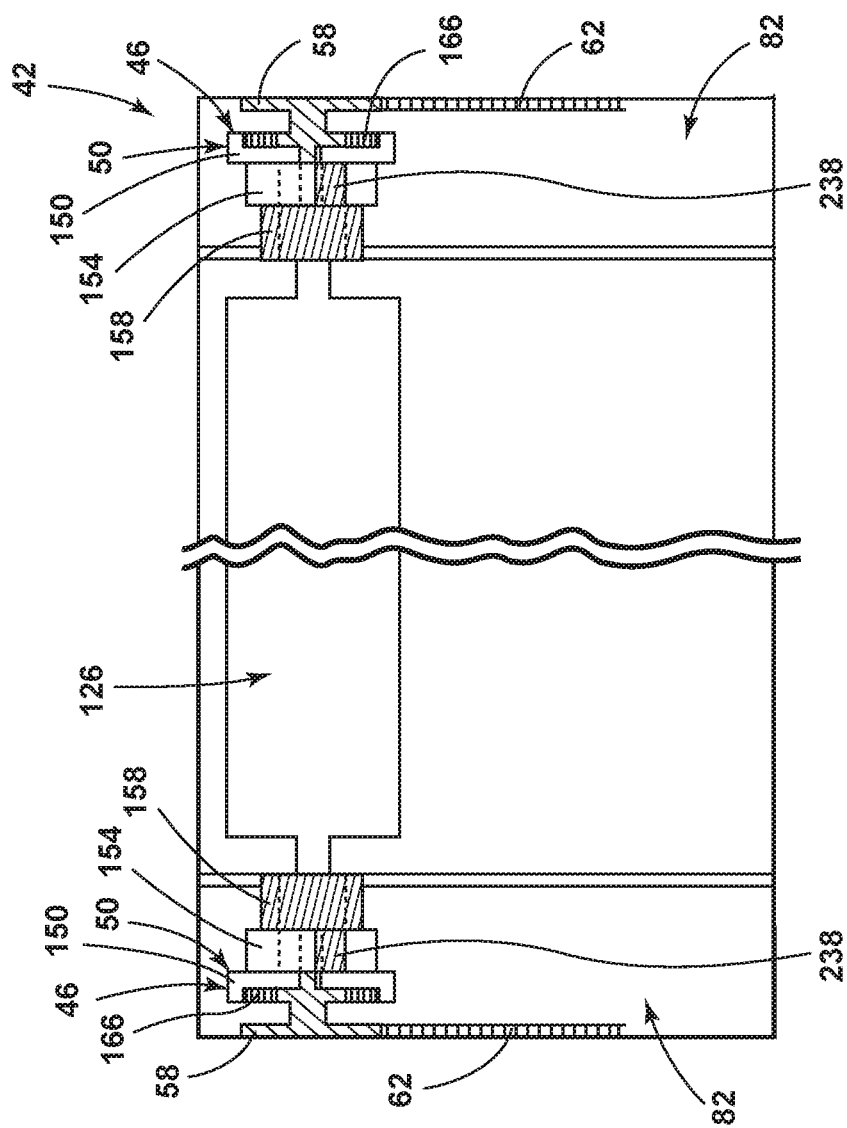
FIG. 14 is a front view of the armrest, illustrating the interaction between the armrest, the gear assembly, and the mounting assemblies, according to one example.
Figure 13:
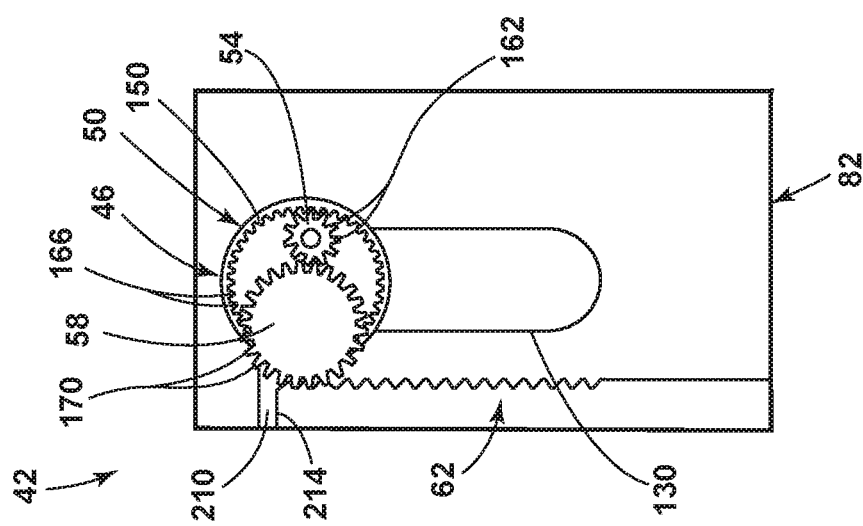
FIG. 13 is a side view of the armrest, illustrating the interaction between the gear assembly and the mounting assembly, according to one example.
Figures 15, 16:
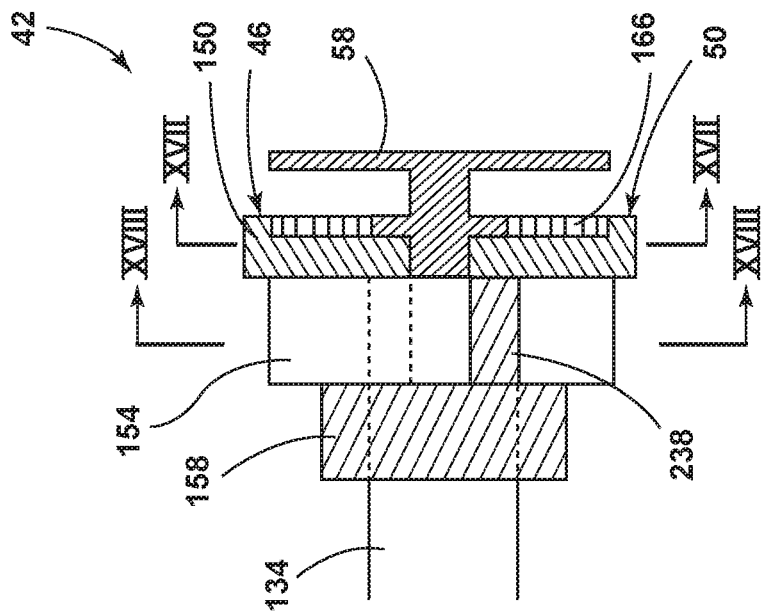
FIG. 15 is a side perspective view of the gear assembly, illustrating various components of the gear assembly, according to one example.
FIG. 16 is a schematic view of the armrest, illustrating an interaction between the gear assembly and the armrest, according to one example.

Referring again to FIGS. 13-18, the planetary gear 54 can include the first planetary gear 218 and the second planetary gear 222. In one example, the teeth 162 on the first planetary gear 218 can engage with the teeth 170 on the pinion gear 58. The teeth 162 on the first planetary gear 218 can also engage with the teeth 166 on the crown gear 50. In such an example, the face width 226 of the teeth 162 on the first planetary gear 218 may be sized to simultaneously engage with the teeth 166 on the crown gear 50 and the teeth 170 on the pinion gear 58. Additionally or alternatively, the second planetary gear 222 can be coaxially aligned with the pinion gear 58 such that rotational motion imparted to the second planetary gear 222 by the crown gear 50 is transmitted to the pinion gear 58. The transmitted rotational motion that is experienced by the pinion gear 58 then results in rotational motion of the pinion gear 58 and traversal of the pinion gear 58 along the rack 62. The traversal of the pinion gear 58 along the rack 62 results in vertical actuation of the gear assembly 46 within the vertical slot 130 in the mounting assembly 82. In various examples, the post 230 of the planetary gear 54 may pass through the guide slot 234 that is defined by the crown gear 50. In examples that employ more than one planetary gear 54, each of the planetary gears 54 can be provided with a separate post 230 that passes through an associated guide slot 234. The guide slot 234 guides the post 230 and ultimately the planetary gear 54 through translational rotational motion between the stowed position and the deployed position of the armrest 42. In the depicted example of FIG. 15, the post 230 of the second planetary gear 222 extends outward from the second planetary gear 222 to additionally support the pinion gear 58. Accordingly, the pinion gear 58 and the second planetary gear 222 share a rotational axis and are coaxially aligned. The motor 238 can drive the crown gear 50 by way of the coupling portion 134 or either of the planetary gears 54 by way of their associated post 230. It may be beneficial for the motor 238 to drive the post 230 of the second planetary gear 222 such that the pinion gear 58 is directly driven by the motor 238 and the crown gear 50 is driven by the rotation of the second planetary gear 222. It is contemplated that more than one of the motors 238 may be employed on a single side of the armrest 42, or as depicted in FIG. 14, each side of the armrest 42 may be provided with one of the motors 238. In some examples that employ multiple motors 238, the motors 238 may be unidirectional such that one of the motors 238 is utilized for deployment operations of the armrest 42 while another of the motors 238 is utilized for stowing operations of the armrest 42. In such an arrangement, the motors 238 being unidirectional may help in the transfer of loads that are applied to the deployed armrest 42 by enabling additional braking component, physical stops, linkages, and so on that prevent rotation of the motors 238 against their designed single direction.

Figure 17:
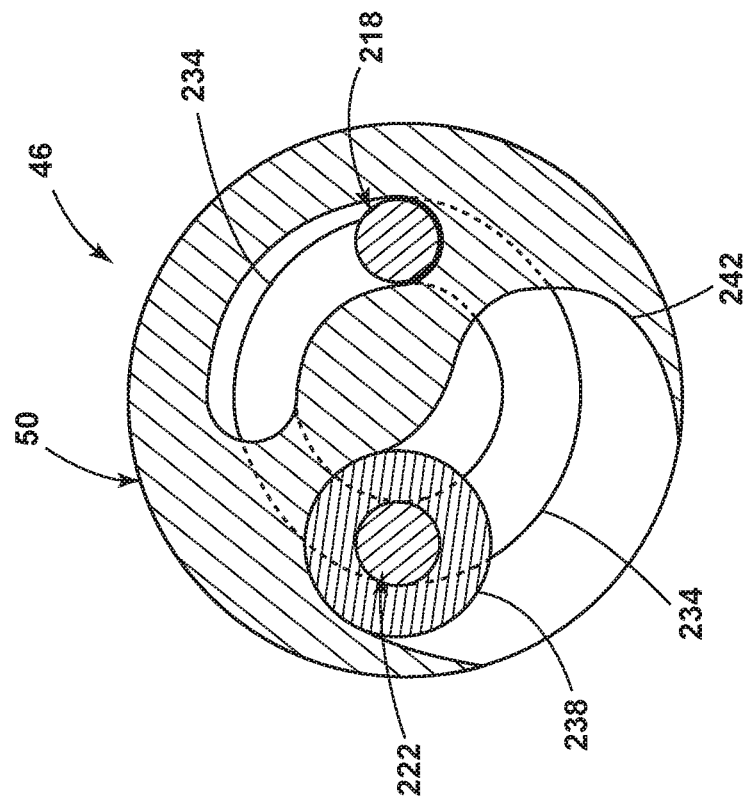
FIG. 17 is a cross-sectional view of the gear assembly, taken along line XVII-XVII of FIG. 16, illustrating the crown gear, according to one example.
Figure 18:
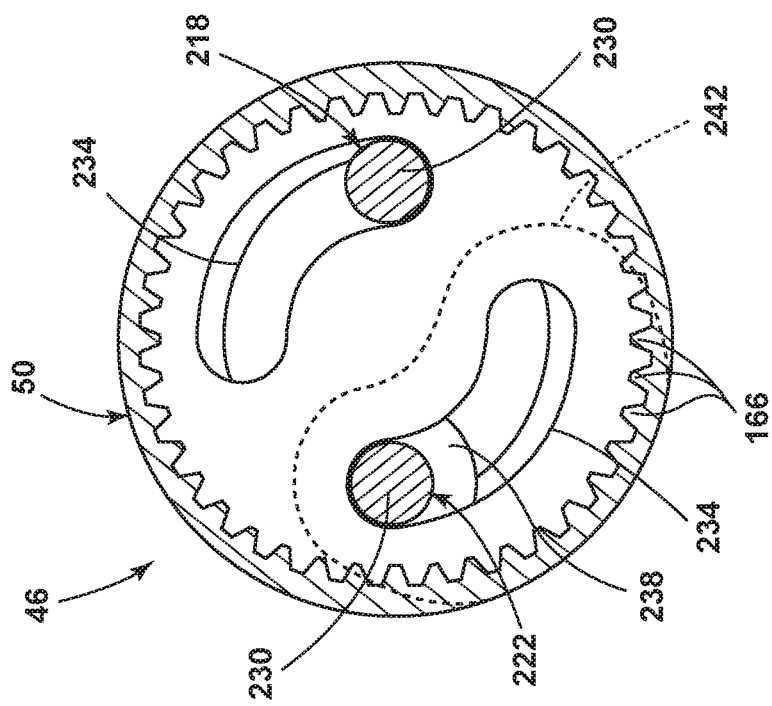
FIG. 18 is a cross-sectional view of the gear assembly, taken along line XVIII-XVIII of FIG. 16, illustrating the crown gear, according to one example.

With specific reference to FIGS. 17 and 18, when the motor 238 is provided in powered or motor-driven examples of the armrest 42, a motor aperture 242 may be defined by the crown gear 50 that generally corresponds with the guide slot 234 that is associated with the post 230 upon which the motor 238 acts. The motor aperture 242 may be shaped in a complimentary fashion when compared to the guide slots 234 so as to prevent the motor 238 from contacting, binding, or sticking with the crown gear 50 as the rotational motion of the gear assembly 46 is executed. Accordingly, the motor aperture 242 provides clearance between the motor 238 and the crown gear 50 as the motor 238 and the post 230 associated with the motor 238 travel through the guide slot 234.

Referring to FIGS. 19-20C, the armrest 42 may be provided with a retention assembly 246. The operation of the retention assembly 246 will be described as a manually-actuated assembly. However, the retention assembly 246, in its various forms, may alternatively be power-actuated or generally remotely actuated by the user 102 rather than directly actuated by the user 102 while maintaining the general interaction and arrangement between the components of the retention assembly 246 and the armrest 42 as a whole. Remotely actuated is intended to refer to the user 102 initiating movement of the armrest 42 from a location that is remote or distant from the armrest 42. The retention assembly 246 can be located at the free end 98 of the armrest 42. The free end 98 of the armrest 42 is contoured to receive the retention assembly 246. Accordingly, the free end 98 includes a recessed portion 250 that is flanked on either side by full-length or raised portions 254 of the armrest 42. The retention assembly 246 can include a handle 258 that is actuatable by the user 102 to transition the retention assembly 246 from an engaged position (FIG. 20A) to a disengaged position (FIG. 20B). The handle 258 is pivotably coupled to the armrest 42 at a first end 262. A second end 266 of the handle 258 can be generally arcuate in shape. The arcuate shape of the second end 266 of the handle 258 can slope in an upward direction to engage with a catch 270 that is defined by a support structure 274 for the armrest 42 (e.g., the seatback 70 of the vehicle seating assembly 38). The engagement between the handle 258 and the catch 270 retains the armrest 42 in the stowed position. The handle 258 may be biased toward the catch 270 by a first biasing member 278 that is positioned between the recessed portion 250 of the armrest 42 and the handle 258. A second biasing member 282 can be provided that biases the armrest 42 in an outward direction (i.e., toward the left as oriented in the figures). The second biasing member 282 is positioned between the support structure 274 and a bearing protrusion 286 that is defined by the armrest 42. The second biasing member 282 acts on the support structure 274 and the bearing protrusion 286. Due to the support structure 274 being a generally rigid structure, the biasing force of the second biasing member 282 pushes outwardly on the bearing protrusion 286. Accordingly, when the user 102 disengages the handle 258 from the catch 270, the second biasing member 282 pushes outwardly on the armrest 42 and ultimately results in the second end 266 of the handle 258 clearing the catch 270. Next, the resilient member 142 that is configured to bias the gear assembly 46 in a vertically upward direction can initiate the automatic or semi-automatic deployment of the armrest 42 in the soft-open manner.

Figure 22A:
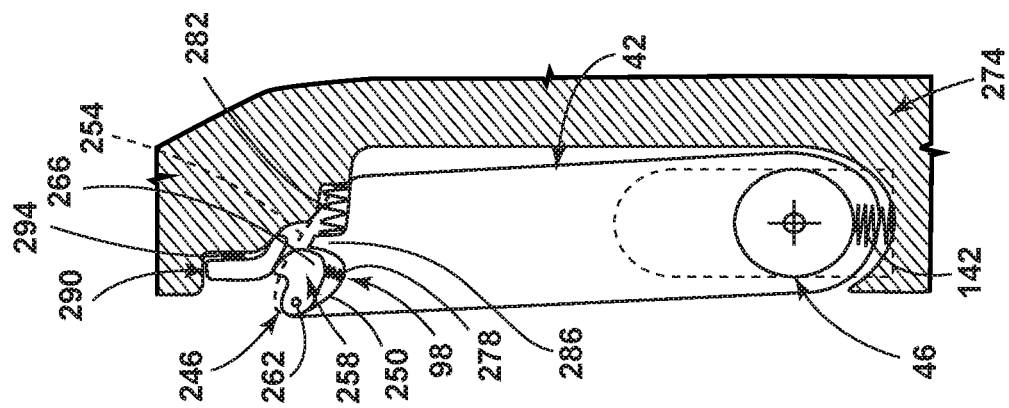
FIG. 22A is a cross-sectional view of the armrest, taken along line XXIIA-XXIIA of FIG. 21, illustrating the retention assembly in an engaged position, according to one example.
Figure 22B:
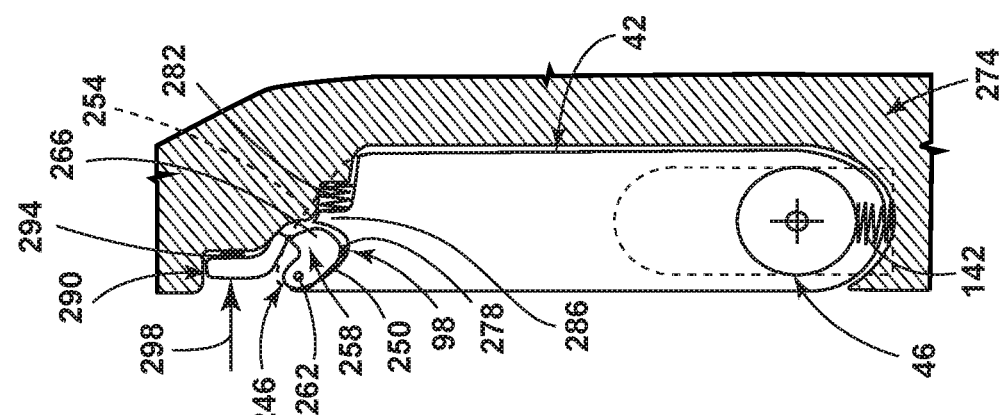
FIG. 22B is a cross-sectional view of the armrest, taken along line XXIIA-XXIIA of FIG. 21, illustrating a release button of the retention assembly in a compressed position, according to one example.
Figure 22C:
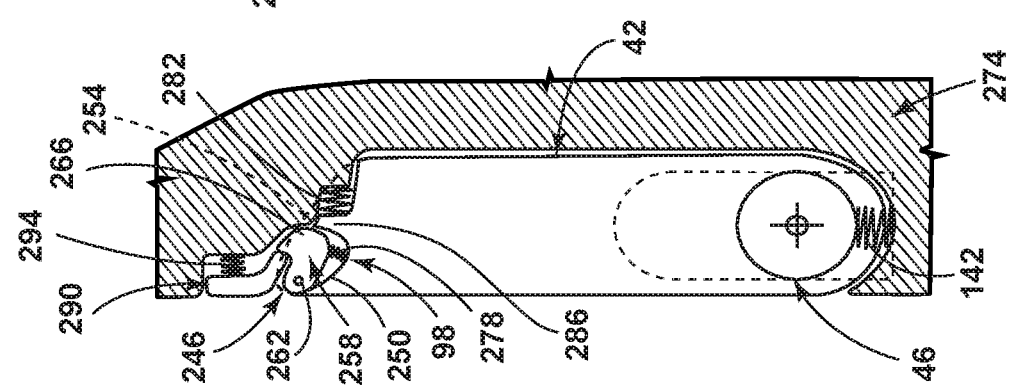
FIG. 22C is a cross-sectional view of the armrest, taken along line XXIIA-XXIIA of FIG. 21, illustrating the retention assembly in a disengaged position, according to one example.
Figure 21:
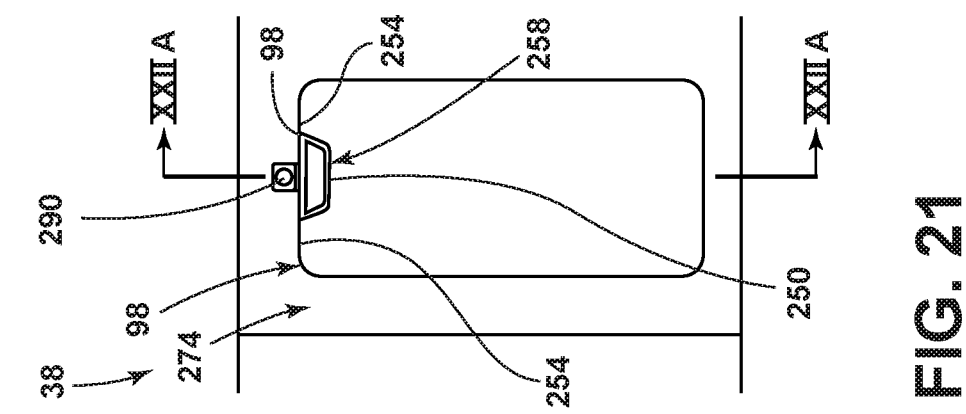
FIG. 21 is a front view of the armrest, according to one example.

Referring now to FIGS. 21-22C, the armrest 42 is shown with the retention assembly 246 according to another example. As with the above example, the operation of the retention assembly 246 will be described as a manually-actuated assembly. However, the retention assembly 246, in its various forms, may alternatively be power-actuated or generally remotely actuated by a user rather than directly actuated by the user while maintaining the general interaction and arrangement between the components of the retention assembly 246 and the armrest 42 as a whole. Remotely actuated is intended to refer to the user 102 initiating movement of the armrest 42 from a location that is remote or distant from the armrest 42. The retention assembly 246 can be located at the free end 98 of the armrest 42. The free end 98 of the armrest 42 is contoured to receive the retention assembly 246. Accordingly, the free end 98 includes the recessed portion 250 that is flanked on either side by the full-length or raised portions 254 of the armrest 42. The retention assembly 246 can include the handle 258 that is actuatable by the user to transition the retention assembly 246 from an engaged position (FIG. 22A) to a disengaged position (FIG. 22B). The handle 258 is pivotably coupled to the armrest 42 at the first end 262. The second end 266 of the handle 258 can be generally arcuate in shape. The arcuate shape of the second end 266 of the handle 258 can slope in an upward direction to engage with a release button 290. The engagement between the handle 258 and the release button 290 retains the armrest 42 in the stowed position. The handle 258 may be biased toward the release button 290 by the first biasing member 278 that is positioned between the recessed portion 250 of the armrest 42 and the handle 258. The second biasing member 282 can bias the armrest 42 in an outward direction (i.e., toward the left as oriented in the figures). The second biasing member 282 is positioned between the support structure 274 and the bearing protrusion 286 that is defined by the armrest 42. The second biasing member 282 acts on the support structure 274 and the bearing protrusion 286. Due to the support structure 274 being a generally rigid structure, the biasing force of the second biasing member 282 pushes outwardly on the bearing protrusion 286. A third biasing member 294 is positioned between the support structure 274 and the release button 290 to bias the release button 290 to an extended position. The user may apply a force 298 to the release button 290 that compresses the third biasing member 294 and rotates the handle 258 such that the first biasing member 278 is compressed. Once the third biasing member 294 and the first biasing member 278 are compressed, the dimensions and contours of the handle 250 and the release button 290 permit the handle 250 to disengage from the release button 290. Next, the second biasing member 282 pushes outwardly on the armrest 42 and ultimately results in the second end 266 of the handle 258 clearing the release button 290. Then, the resilient member 142 that is configured to bias the gear assembly 46 in a vertically upward direction can initiate the automatic or semi-automatic deployment of the armrest 42 in the soft-open manner.

The armrest 42 of the present disclosure provides the user with a unique soft-open and soft-close actuation that requires less effort to operate than the conventional armrest 86 in manually actuated examples. Additionally, the armrest 42 of the present disclosure provides a unique soft-open and soft-close actuation in power actuated examples. In both manual and powered examples, the armrest 42 experiences vertical and rotational motion simultaneously to transition between the stowed position and the deployed position. The unique deployment of the armrest 42 can leave a lasting impression on the user and generally improves an overall aesthetic and finish of the cabin 34 of the vehicle 30.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An armrest, comprising:
   a gear assembly having a crown gear directly coupled to the armrest that imparts rotational motion to the armrest, first and second planetary gears engaged with the crown gear, and a pinion gear coupled to the crown gear that imparts vertical motion of the entire gear assembly, as well as the armrest, along a rack, wherein teeth on one of the first planetary gear and the second planetary gear engages with teeth on the pinion gear, and wherein the other of the first planetary gear and the second planetary gear is coaxially aligned with the pinion gear.

2. The armrest of claim 1, further comprising:
   a mounting assembly having a ramp structure that is engaged by a protrusion on the crown gear.

3. The armrest of claim 2, wherein the protrusion interacts with the ramp structure.

4. The armrest of claim 1, wherein a corresponding guide slot defined by the crown gear guides a respective post the first and second planetary gears through translational rotational motion between a stowed position and a deployed position of the armrest.

5. The armrest of claim 1, wherein a rotation axis of the pinion gear is axially offset from a rotation axis of the crown gear.

6. The armrest of claim 5, wherein the pinion gear extends beyond a circumference of the crown gear.

7. The armrest of claim 1, further comprising:
   a resilient member that biases the gear assembly in a vertically upward direction toward a deployed position of the armrest.

8. The armrest of claim 1, further comprising:
   a retention assembly that retains the armrest in a stowed position.

9. A vehicle seating assembly, comprising:
   an armrest;
   a gear assembly having a crown gear directly coupled to the armrest that imparts rotational motion to the armrest, a planetary gear engaged with the crown gear, and a pinion gear coupled to the crown gear that imparts vertical motion of the entire gear assembly, as well as the armrest, along a rack, wherein a rotation axis of the pinion gear is axially offset from a rotation axis of the crown gear, and wherein the pinion gear extends radially outward beyond a circumference of the crown gear; and
   a mounting assembly having a ramp structure that is engaged by a protrusion on the crown gear.

10. The vehicle seating assembly of claim 9, wherein the protrusion interacts with the ramp structure.

11. The vehicle seating assembly of claim 9, wherein the planetary gear comprises a first planetary gear and a second planetary gear, wherein teeth on one of the first planetary gear and the second planetary gear engages with teeth on the pinion gear, and wherein the other of the first planetary gear and the second planetary gear is coaxially aligned with the pinion gear.

12. The vehicle seating assembly of claim 9, wherein a post of the planetary gear passes through a guide slot defined by the crown gear, and wherein the guide slot guides the planetary gear through translational rotational motion between a stowed position and a deployed position of the armrest.

13. The vehicle seating assembly of claim 9, further comprising:
- a resilient member that biases the gear assembly in a vertically upward direction toward a deployed position of the armrest; and
- a retention assembly that retains the armrest in a stowed position.

14. A vehicle seating assembly, comprising:
- an armrest positioned in a seatback and operable between a stowed position and a deployed position;
- a gear assembly having a crown gear directly coupled to the armrest that imparts rotational motion to the armrest, first and second planetary gears engaged with the crown gear, and a pinion gear coupled to the crown gear that imparts vertical motion of the entire gear assembly, as well as the armrest, along a rack, wherein teeth on one of the first planetary gear and the second planetary gear engages with teeth on the pinion gear, and wherein the other of the first planetary gear and the second planetary gear is coaxially aligned with the pinion gear; and
- a mounting assembly having a ramp structure that is engaged by a protrusion on the crown gear.

15. The vehicle seating assembly of claim 14, wherein a corresponding guide slot defined by the crown gear guides a respective post of the first and second planetary gears through translational rotational motion between a stowed position and a deployed position of the armrest.

16. The vehicle seating assembly of claim 14, wherein a rotation axis of the pinion gear is axially offset from a rotation axis of the crown gear, and wherein the pinion gear extends beyond a circumference of the crown gear.

* * * * *